United States Patent [19]
Gaines et al.

[11] 3,907,325
[45] Sept. 23, 1975

[54] SULKY HAVING ADJUSTABLE STRUCTURE

[75] Inventors: Clarence F. Gaines, Sherburne; Chester C. DePew, Farmingdale, both of N.Y.

[73] Assignee: Clarence Gaines, Sherburne, N.Y.

[22] Filed: Nov. 29, 1973

[21] Appl. No.: 419,992

[52] U.S. Cl. ................................ 280/34 R; 280/63
[51] Int. Cl.² ........................................ B62C 1/08
[58] Field of Search ............. 280/63, 64, 34 R, 203, 280/204; 54/39

[56] References Cited
UNITED STATES PATENTS

| | | | |
|---|---|---|---|
| 609,857 | 8/1898 | West | 280/204 |
| 815,917 | 3/1906 | Gardner | 54/39 |
| 1,423,144 | 7/1922 | Paul | 54/39 |
| 2,896,962 | 7/1959 | Gaines et al. | 280/63 |
| 3,163,438 | 12/1964 | Bliss, Jr. | 280/34 R X |
| 3,415,533 | 12/1968 | Bliss, Jr. | 280/63 X |
| D131,158 | 1/1942 | Foster | 280/63 X |

FOREIGN PATENTS OR APPLICATIONS 745,928  11/1966  Canada .............................. 280/63

*Primary Examiner*—David Schonberg
*Assistant Examiner*—Michael J. Forman
*Attorney, Agent, or Firm*—Edward H. Loveman

[57] ABSTRACT

A sulky has a frame structure which is adjustable in length and width. The frame structure has shaft assemblies including telescoped shaft members, and a transverse frame assembly of beams adjustable in length and connecting the shaft assemblies. The sulky wheels have axle bolts engaged in selective positions on wheel supports carried by the transverse frame assembly. Positions of the driver's seat and stirrups are also adjustable. A tow bar assembly adjustable in length transversely connects front ends of the shaft assemblies.

10 Claims, 10 Drawing Figures

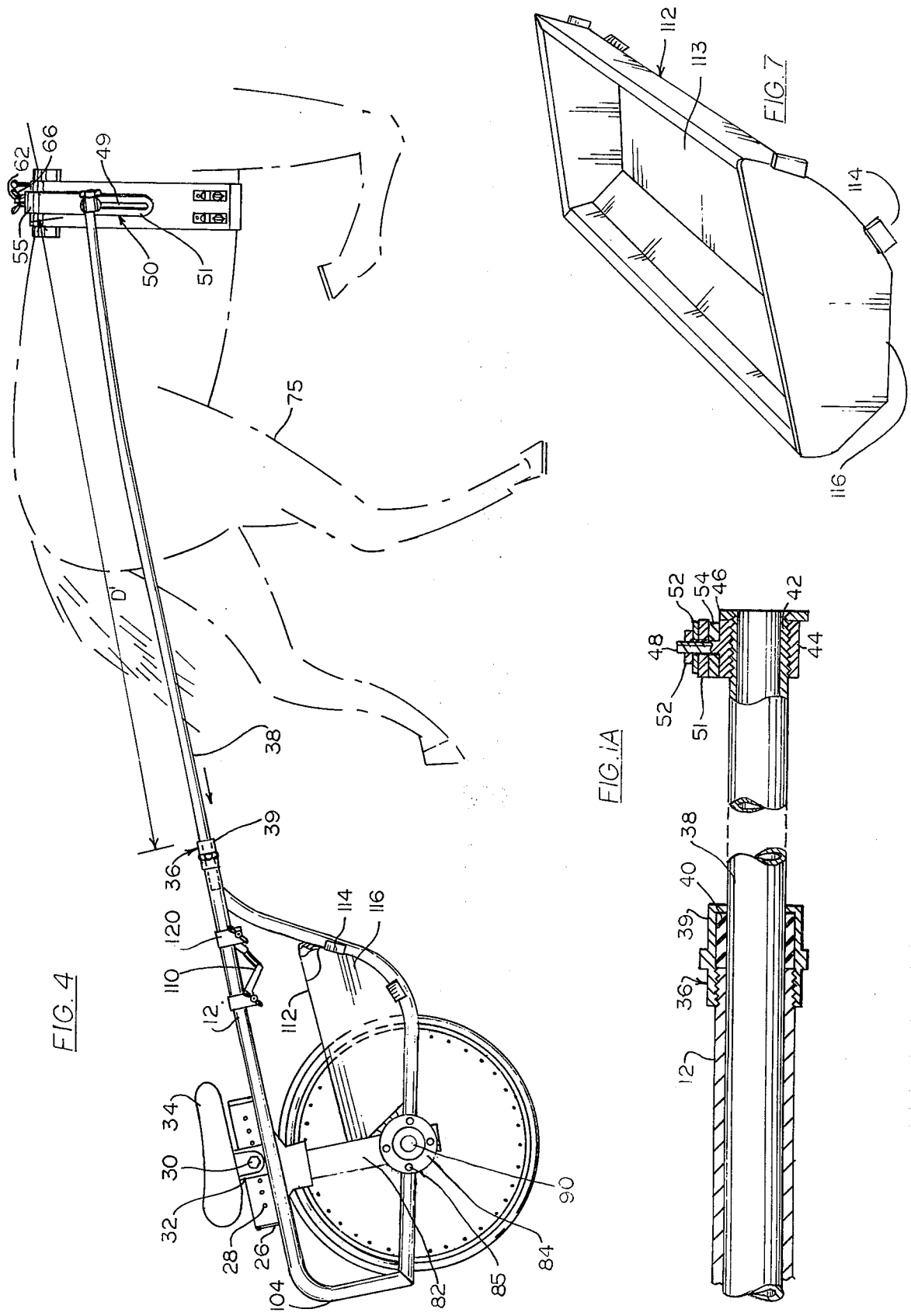

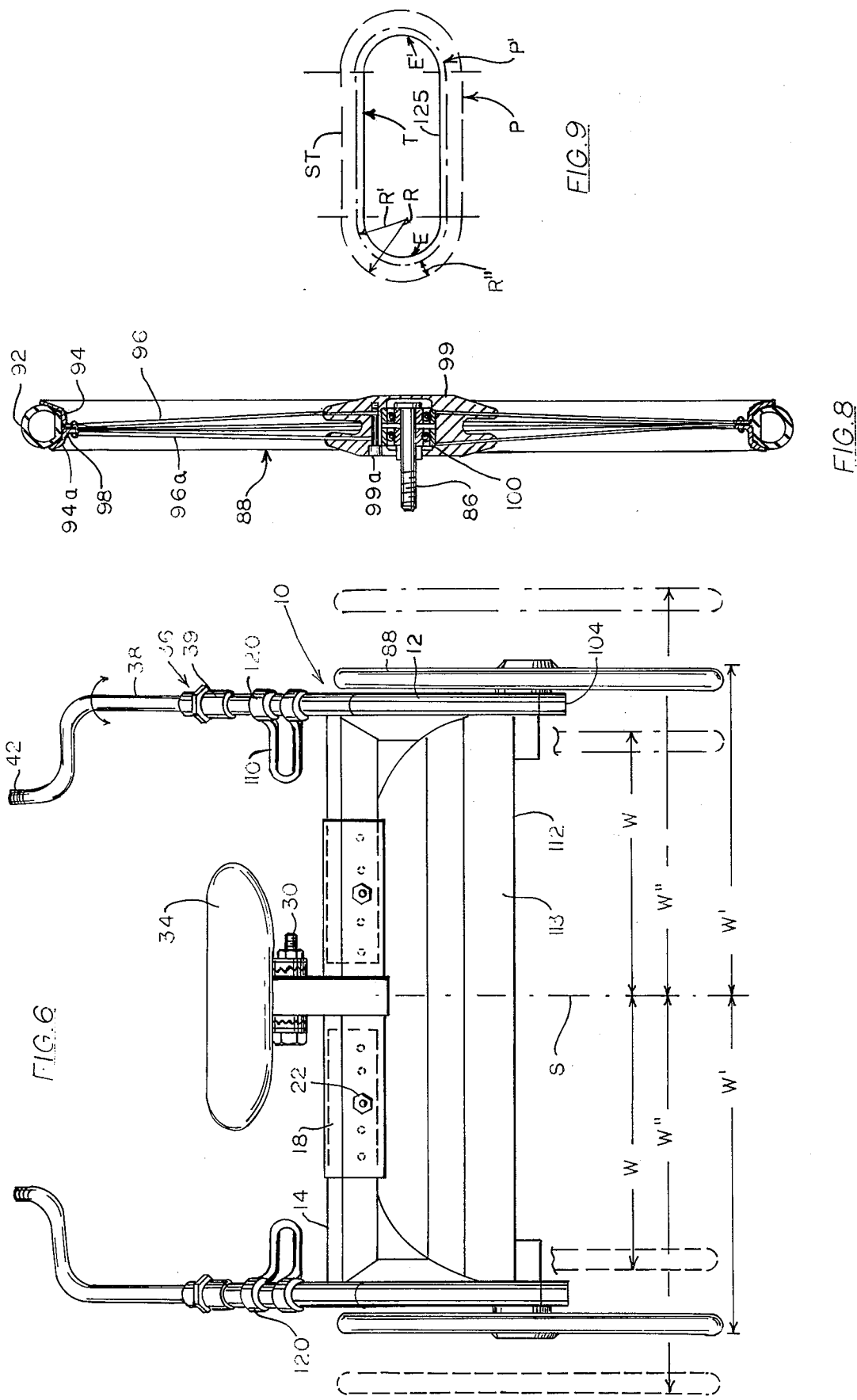

SULKY HAVING ADJUSTABLE STRUCTURE

This invention concerns a sulky having an improved structure with adjustable features.

In our prior copending patent application, Ser. No. 404,754, filed Oct. 9, 1973, we described an improved adjustable pivotable tow bar assembly for a horse drawn sulky of the type used for trotting races. The primary object of that tow bar assembly was to provide a means to position the horse laterally a few inches closer to the inside rail of a track than was heretofore possible. The present invention develops that concept further by eliminating the outer fork and providing the sulky with adjustable frame members which enable the central longitudinal plane of a symmetry of the driver's seat to be aligned with the central longitudinal plane of the horse. In addition the overall length and width of the sulky can be reduced or enlarged.

The invention involves further adjustable features including telescopically adjustable shafts, an adjustable transverse frame assembly, adjustably positionable wheels, driver's seat and stirrups. The sulky frame is further improved by the addition of lateral brace members which reinforce the frame structure. By making shaft and sulky adjustments and mounting a foot basket, the assembly may be converted from a racing sulky to a jog cart or a training sulky. These braces also serve as steps to aid the driver in mounting, and as wheel deflectors to prevent locking of wheels of adjacent sulkies during a race. The invention further involves improved wheel supports which permit the sulky to be positioned laterally closer to the inside rail of a track than is possible with conventional sulkies.

The significance and importance of lateral shift of the horse and sulky closer to the inside rail of a track are based on the following considerations. The usual trotting race track is one half mile in length. By locating the horse and sulky a few inches laterally closer to the inside rail, 3 inches for example, the horse runs about 18 inches less than usual in going once around the track, i.e. in traversing both semicircular ends of the track. In a 1 mile race, where the horse runs twice around the track, the distance traveled is about 36 inches less. Such savings in distance traveled can often result in winning a close race.

Therefore, the principal object of the present invention is to provide an improved sulky and wheel structure to permit the sulky to come closer to the inside rail of a track than would otherwise be possible.

Another object of the present invention is to provide an adjustable sulky frame structure used in combination with an adjustable tow bar assembly for aligning the central planes of a horse and driver's seat, and locating the horse as close as possible to the inside rail of a racetrack.

Still another object of the present invention is to provide an improved sulky wheel and support without laterally protruding outside fork members to permit the sulky to come closer to the inside rail of a track than would otherwise be possible and to eliminate the protruding parts of conventional sulkies which tend to catch or engage parts of adjacent sulkies in a race, or interfere with the inside rail of the race track.

Yet another object of the present invention is to provide a sulky with an improved adjustable frame structure for varying the length and width of the sulky, for adjusting height and inclination of the driver's seat and shafts, and for changing the position of the stirrups on the shafts.

A further object of the present invention is to provide a sulky with shaft assemblies including axially telescopic and adjustable shaft sections.

A still further object of the present invention is to provide an improved sulky frame structure with a removable basket and frame members to support it, for converting the sulky assembly to a training or jogging cart.

These and other objects and many of the attendant advantages of this invention will be readily appreciated as the same becomes better understood by reference to the following detailed description when considered in connection with the accompanying drawings in which:

FIG. 1A is an enlarged fragmentary sectional view taken along line 1A—1A of FIG. 1;

FIG. 4 is a side view of the sulky arranged as a jogging or training cart, near wheel being removed;

FIG. 6 is a rear end view of the sulky arranged as in FIGS. 4 and 5, but with the tow bar assembly omitted;

FIG. 7 is a perspective view of the foot basket per se;

FIG. 8 is a diametral cross sectional view of a sulky wheel according to the invention; and FIG. 9 is a diagram of a trotting track used in explaining results obtained by use of this invention.

Figure 1:
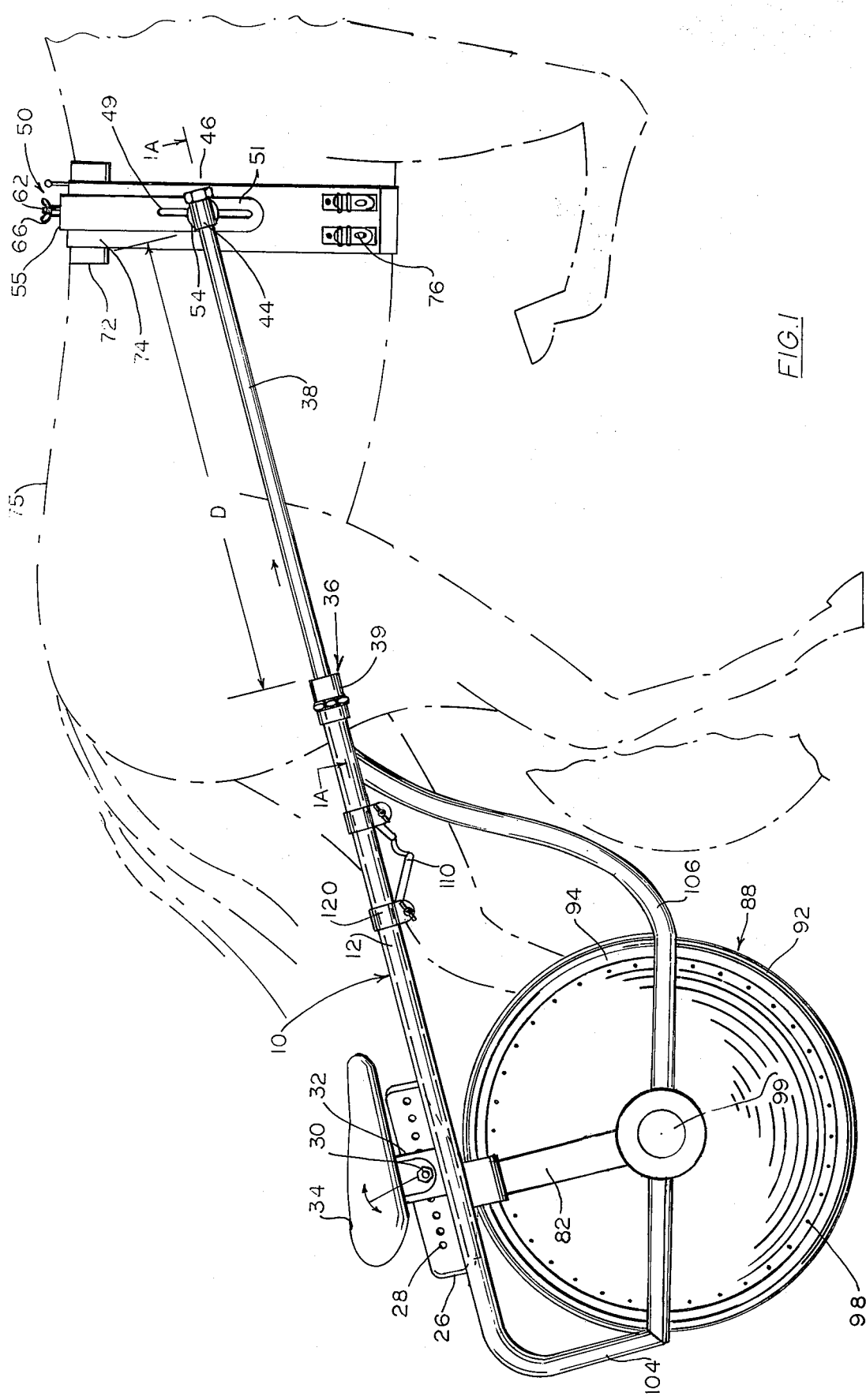
FIG. 1 is a side view of a sulky embodying the invention and is shown with the near wheel removed.
Figure 2:
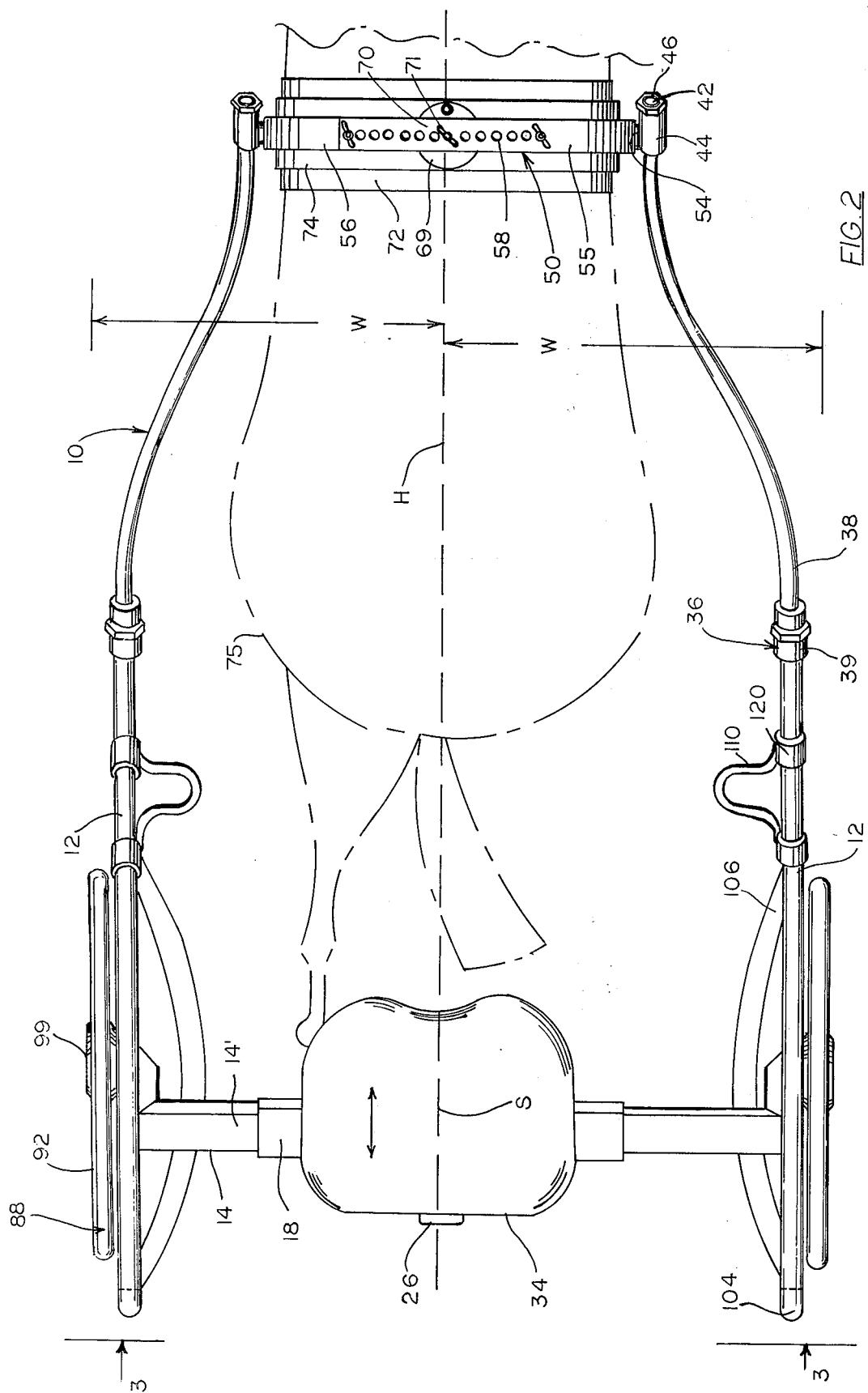
FIG. 2 is a top plan view of the sulky of FIG. 1.
Figure 3:
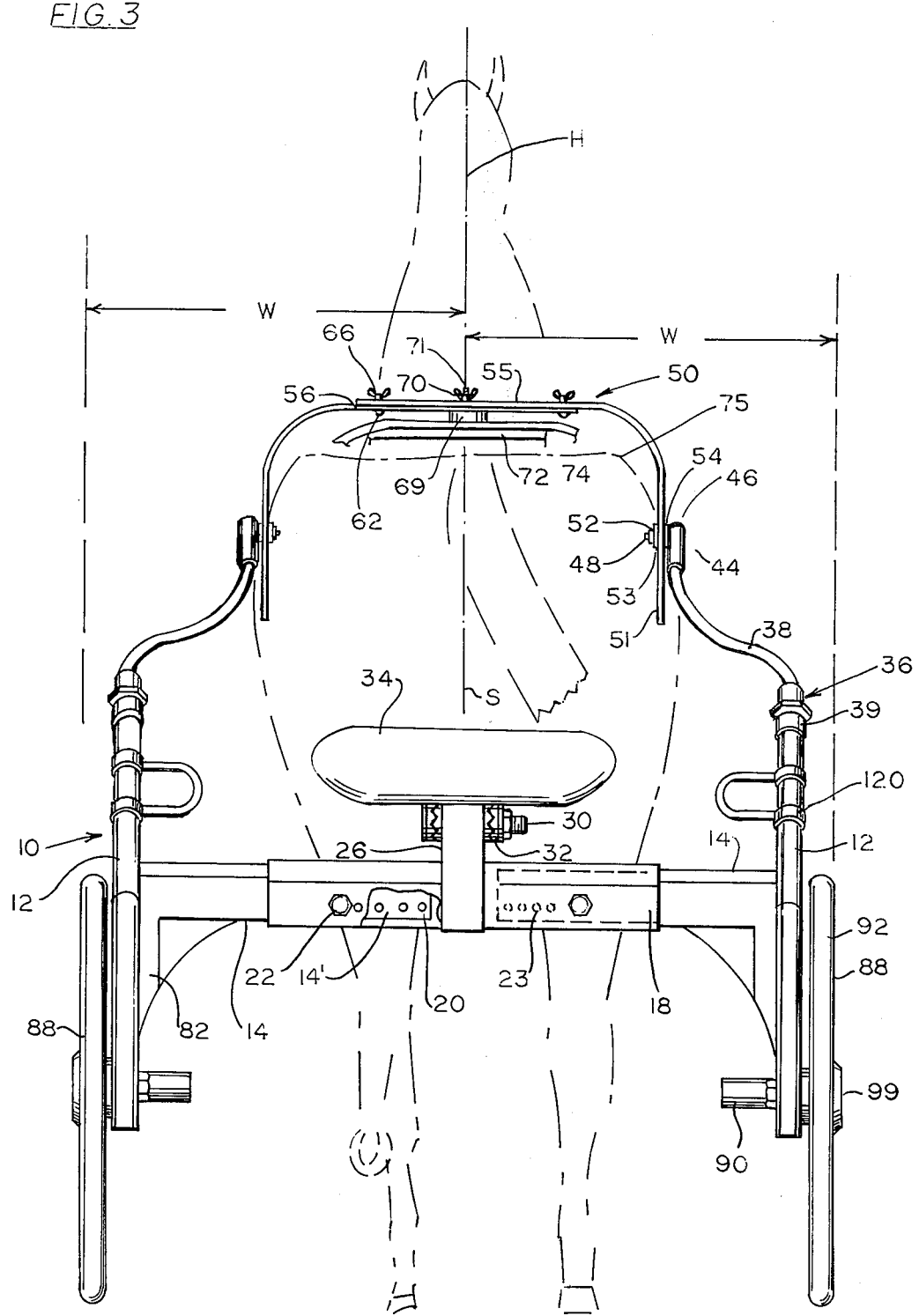
FIG. 3 is a rear end elevational view of the sulky taken along line 3—3 of FIG. 2.

Referring now to the drawings wherein like reference characters designated like or corresponding parts throughout, there is illustrated in FIGS. 1, 2 and 3, a sulky generally designated as reference numeral 10 and which includes a pair of shaft assemblies having laterally spaced sleeve shafts 12 each of which is respectively welded to a different L-shaped hollow beams 14 (FIG. 2) slidably engaged in a rectangular sleeve 18. The inner end portion 14' of each beam 14 is formed with a plurality of threaded holes 20; see FIG. 3. A bolt 22 may be mounted in a spaced hole 23 in the sleeve 18 to engage a selected hole 20 in the beams 14, depending on the extent of insertion of the beam 14 in the sleeve 18. Centered on the sleeve 18 is a seat base 26.

The seat base 26 is formed with a plurality of spaced holes 28 to receive a bolt 30 for securing an angularly adjustable seat clamp 32. The clamp 32 carries a seat 34 for the driver of the sulky. By the arrangement described, the two shafts 12 may be spaced closer together or further apart, and the seat 34 may remain centered between them. Also the seat 34 may be adjustably positioned longitudinally on the seat base 36, and may be angularly adjusted in a vertical plane by means of the clamp 32. The beams 14 are located near the rear ends of the shafts 12.

At the open forward end of each of the sleeve shafts 12 is a collet clamp 36 for coupling an adjustable tubular shaft extension 38 with the shaft 12. Each collet clamp 36, as best shown in FIG. 1A, is internally threaded and includes a cylindrical casing 39 surrounding the forward threaded end of the shaft 12. A compressible rubber bushing 40 is disposed in the casing 39 and frictionally grips the shaft extension 38 when the collect clamp 36 is tightened on the threaded end of the shaft 12. The rear end portions of the shaft extensions 38 are straight so they can slide axially in the shafts 12. Forward portions of the shaft extensions 38 are curved and terminate in a threaded ends 42 which carries an internally threaded collar 44 which can be fixed in a place by a locknut 46 at the end of the shaft extension. A threaded bolt 48 extends laterally inward of each collar 44 through a slot 49 formed in each depending leg 51 (FIG. 3) of a U-shaped tow bar assembly generally designated as reference numeral 50. The bolt 48 is engaged by a nut 52 inside of each leg 51. Washers 53 and 54 are mounted on opposite sides of each of the legs 51. By the arrangement described the forward end of each shaft extension 38 can be adjustably secured to the outside of each of the tow bar legs 51.

The tow bar assembly 50 is similar to that described in our prior patent application hereinabove mentioned. The U-shaped tow bar assembly 50 has a bight formed by overlapping horizontal bars 55, 56. One hole of a plurality of holes 58 formed in each of the bars 54, 56 can be selectively disposed in registration and secured in place by a bolt 62 and a wingnut 66. A plate 69 disposed under the bars 54, 56 carries a bolt 71 secured by a wingnut 70. The plate 69 is secured to a pad 72 which underlays a saddle 74 of a horse 75, shown in dotted lines. The saddle 74 will be secured in place around the horse 75 by tightening and securing a strap and buckle assembly 76. The pad 72 and the plate 69 are located on the central longitudinal plane of symmetry H of the horse; see FIGS. 2 and 3. By adjustably overlapping the bars 55, 56, the forward ends of the shaft extension 38 can be selectively located closer to or further from the opposite sides of the horse 75.

Each of the L-shaped beams 14 has a depending leg 82 formed with an integral hub 84, (FIG. 4) which has a plurality of spaced holes 85 any one of which can selectively receive an axle bolt 86 (FIG. 8) of a wheel 88. The bolt 86 is secured on the hub 84 by a cap nut 90 extending axially inward of the wheel 88.

The structure of each of the wheels 88 is best shown in FIG. 8. A rubber tire 92 is engaged on the periphery of a pair of channel rims 94 and 94a which are integrally formed on a respective pair of disks 96, 96a which are securely mounted to a central hub 99 by a plurality of screws 99a. The outer periphery of the disk 96 and the channel rim 94 and the disk 96a and the channel rim 94a are secured together via a plurality of rivets 98. It should be noted that the channel rim 94 is larger in diameter than the rim 94a to protect the tire 92 from horse hoofs and contact rubbing with other sulkies. At the center of the hub 99 is a ball bearing 100 carrying the axle bolt 86. The inner and outer races of bearing 100 are so proportioned so that when the bolt 86 is tightened the bearing will be preloaded and thereby eliminate looseness or wobble in the rim of the wheel 88. It will be apparent that the bolt 86 can be secured by a nut 90 nonrotatable to the hub 84 carried by the frame of the sulky while the wheel 88 rotates freely.

The rear end portion 104 of the shaft 12 extends downwardly and is secured to a rear end of a respective strut 106. The tubular strut 106 is welded at its forward end to the underside of the shaft 12 just before a stirrup 110. Each of the struts 106 extends downwardly and is inclined rearwardly as clearly shown in FIG. 4 and FIG. 5. They are also bowed inwardly as seen in FIG. 2 and are joined to a bottom end portion 104 of the shaft 12. The struts 106 serve as wheel deflectors to prevent engagement of wheels of adjacent sulkies in a race. They also serve as steps to assist the driver in mounting the sulky, and further reinforce the frame structure. The struts 106 may also support a foot basket 112 shown in FIGS. 4–7 which has a curved bottom 113 to fit snugly on the curved portions of the struts 106. A pair of hook-like flanges 114 extend outwardly from each flat end wall 116 of the basket 112 and engage on the strut 106 to hold the basket 112 in place. When the basket 112 is installed as shown in FIGS. 4–7, the sulky is converted to a training or jogging cart. The driver (not shown) places his feet in the basket 112 instead of engaging them in the stirrups 110. The stirrups 110 are metallic straps secured at opposite ends to a pair of spaced collars 120 mounted on the sleeve shafts 12. The collars 120 are gripped frictionally and can be adjusted axially on the shafts 12 for adjustably positioning the stirrups 110 thereon.

It will be noted in FIGS. 2 and 3 that the central longitudinal planes H and S of the horse and seat respectively are aligned longitudinally of the sulky. This vertical center plane H, S is spaced an equal distance W from each of the two wheels. Distance W can be made greater by moving beams 14 outwardly to locate plane H, S an intermediate distance W' as shown in FIG. 6. The sulky can be made still wider by moving the beam still further apart, to space the wheels up to a maximum distance W'' from the center plane of the sulky.

It will be noted that the adjustment of the width between the shaft extensions 38 of the sulky is made possible by the free mounting of shaft extensions 38 in the sleeve shafts 12. The shaft extensions 38 can be rotated to vary the distance therebetween and the distance between the shafts 12 is varied as the beams 14 are moved in or out. The shaft assemblies 12 and 38 are adjustable in length between minimum and maximum limits. In FIG. 1 the shaft extensions 38 extend minimum distances D from the sleeve shafts 12. In FIG. 4 the shaft extensions extend maximum distances D'. This range of adjustment may be about 3 feet.

It will be further noted that the wheels 88 are supported only by inside hubs 84. At their outer sides, the wheels are clear of the fork legs used in conventional sulky wheels supports. This construction makes it possible to locate the sulky about 2 inches or more closer to the inside rail of a track than would otherwise be possible. Furthermore the horse can be located as much as 3 inches closer to the inside rail by shortening the outward extension of the inner beam 14. By shortening both beam extensions, the horse can be centered between the shafts, and in addition the driver's seat can be aligned centrally with the central plane between the shafts. By the adjustable arrangement of the sulky frame parts and the tow bar assembly, and the elimination of outer wheel fork legs as described above, it is possible to locate the horse as much as 5 inches closer to the inside rail of a track than in a conventional sulky. The significance of this can be best understood by referring to FIG. 9.

Figure 5:
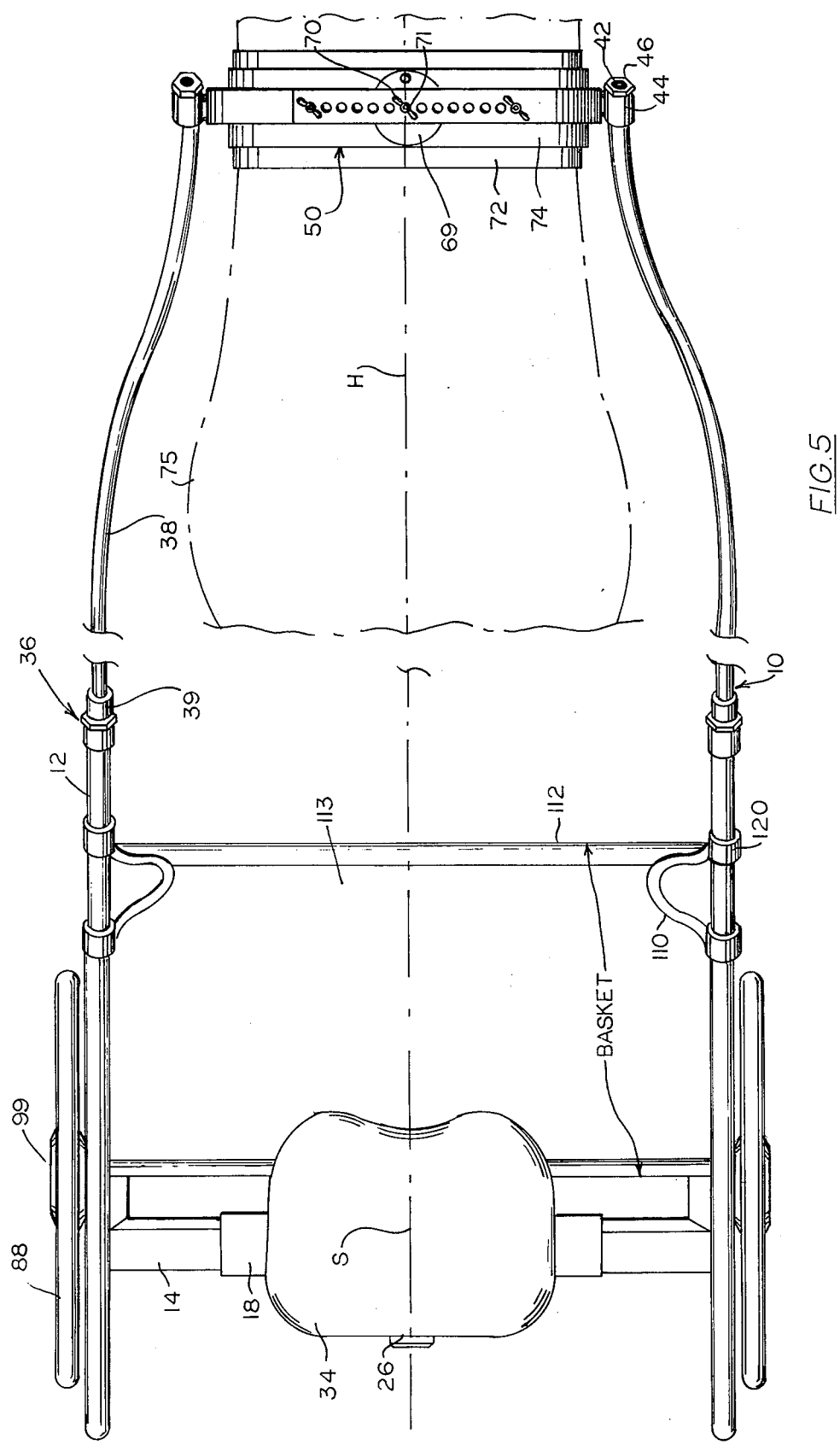
FIG. 5 is a top plan view of the sulky of FIG. 4.

In FIG. 9 is shown a trotting track T which may be a half mile in total length. It has an inside rail 125. Ends E and E' of the track are semicircular. Suppose the horse and sulky are coupled together as shown in FIGS. 4–6 and travel a path P around the track. Suppose now the horse is displaced laterally toward rail 125 by shortening the tow bar assembly, and the sulky is narrowed by inward adjustment of the beams 14, the horse in this setup will travel path P'. The difference in distance traveled by the horse in both paths at end E will be P−P' = π (R−R'), where R and R' are the radii of travel paths P and P' at ends E and E'. There is no difference between paths P and P' in straight sections ST and ST'. If R−R'= R''= 3 inches, then P−P'= 3π inches = 9.4 inches. Similarly, at the end E', the travel distance will be 9.4 inches less. In traversing the track once, the horse will travel 18.8 inches less in path P' than in P. In a 1 mile race, traversing the track twice, the total distance traveled will be 37.6 inches shorter in path P'. In both ½ mile and one full mile races, where the finishing horses are all close to the finishing line, these savings of 18.8 inches or 37.6 inches can cause the winning of the race by a horse and sulky equipped with the adjustable tow bar assembly and adjustable sulky frame. Since the sulky has no parts protruding laterally beyond the wheels, the sulky can be 2 inches or more closer to the inside rail 125. This enables a still further saving in distance traveled by the horse, so that in a half mile race the horse will travel as much as 31.4 less and in a mile race the horse will travel 62.8 inches less. In a close race with conventional sulkies, a sulky equipped with the present invention can obtain a winning advantage due to the improved sulky construction.

The several types of adjustments described are all easily made and require no special skills or tools. They do not materially increase the weight of the sulky. The adjustable sulky parts can be made of lightweight aluminum or magnesium or of strong tough lightweight plastic, or even wood may be used for many parts.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A sulky comprising:
    a pair of laterally spaced elongated shaft assemblies for receiving a horse therebetween; each of said shaft assemblies having a front end displacably fixed in any one of a plurality of longitudinal planes different than a rear respective end of said shaft assembly;
    means for adjusting each of said shaft assemblies in length and in the distance between respective front ends thereof;
    a transverse frame assembly connecting said shaft assemblies near said rear ends thereof;
    means for adjusting the overall length of said transverse frame assembly so that said rear ends of said shaft assemblies are adjustably spaced apart;
    a wheel means carried at each end of said transverse frame assembly; and
    a seat support carried by said transverse assembly and arranged to support adjustably on a driver's seat thereon.

2. A sulky as defined in claim 1, further comprising stirrups carried by said shaft assemblies and adjustably positioned along said shaft assemblies.

3. A sulky as defined in claim 1, further comprising strut means joined to said shaft assemblies, said strut means serving as mounting steps for the driver of said sulky.

4. A sulky as defined in claim 3, further comprising a foot support for the driver removably mounted on said strut means for converting said sulky to a training cart.

5. A sulky as defined in claim 3, wherein said strut means have curved portions serving as deflectors to prevent engagement of wheels of the sulky by other wheels of adjacent sulkies in a race.

6. A sulky as defined in claim 1 wherein said wheel means comprises two wheel supports each of which is mounted at one end of said transverse frame assembly and a wheel mounted on each of said wheel supports.

7. A sulky as defined in claim 6 wherein each of said wheel supports has an axle bolt extending laterally inward, and a bearing means for receiving said axle bolt, each of said wheels being disposed entirely outside its respective wheel support to minimize the width of said sulky at said wheels and leave said wheels free of obstruction at their outer sides.

8. A sulky as defined in claim 1, further comprising a tow bar assembly extending transversely between said shaft assemblies and removably attached to free forward ends of said shaft assemblies; and means for adjusting said tow bar assemblies in length to equal the spacing between said forward ends of said shaft assemblies.

9. A sulky as defined in claim 1, wherein each of said shaft assemblies comprises axially telescoped members.

10. A sulky as defined in claim 1, wherein said transverse frame assembly comprises two angle beams, and a tubular beam slidably engaging aligned parts of said angle beams.

* * * * *